Aug. 21, 1962 J. L. WALSH 3,050,641

LOGIC CIRCUIT HAVING SPEED ENHANCEMENT COUPLING

Filed July 20, 1959

INVENTOR
JAMES L. WALSH

BY

ATTORNEY 3,050,641

LOGIC CIRCUIT HAVING SPEED ENHANCEMENT COUPLING

James L. Walsh, Hyde Park, N.Y., assignor to International Business Machines Corporation, New York, N.Y., a corporation of New York Filed July 20, 1959, Ser. No. 828,091
1 Claim. (Cl. 307—88.5)

This invention relates to logical circuits and more particularly to circuitry for increasing the speed of operation of electronic computers.

In computer systems utilizing semiconductor devices, the logical circuitry used for accomplishing the arithmetic functions exhibits relatively high capacitances to ground. Thus, the output of each logical stage works into the predominately capacitive impedance of the succeeding stages. The time required to charge and discharge this circuit capacitance has had a limiting effect on the speed of existing logical circuits. The present invention provides a way to overcome this capacitive effect simply and at a minimum of cost.

Accordingly, it is the principal object of this invention to provide high speed logical circuits.

A further object of this invention is to provide high speed logical circuitry consisting principally of semiconductive components.

A still further object of this invention is to provide logical circuitry for computers capable of overcoming the capacitance effects generally present in such circuitry.

Yet another object of this invention is to provide logical circuitry utilizing complementing techniques for rapid performance of logical functions.

Briefly, this invention comprises an auxiliary current source coupled to a logical circuit and operative in response to performance of the logical function thereof to supply additional current to the capacitive load during the charge or discharge portion of the cycle, as the case may require. An asymmetrically conducting device, such as a diode, is connected at the output of the logical network. The auxiliary current source, such as a transistor amplifier, has its control electrodes connected to said asymmetrically conducting device so as to be rendered operative during a predetermined condition of conductivity of said device. Thus, in one form of the invention, the current source is rendered operative during conduction of the asymmetric device while in another form it is rendered operative during non-conduction of said device. Because of their unique characteristics, the logical blocks thus formed may be connected in chains to perform complicated logical functions. When so connected, they interact in a complementary fashion to render the advantages enjoyed by each to be realized cumulatively.

The foregoing and other objects, features and advantages of the invention will be apparent from the following more particular description of preferred embodiments of the invention, as illustrated in the accompanying drawings.

Figure 1:
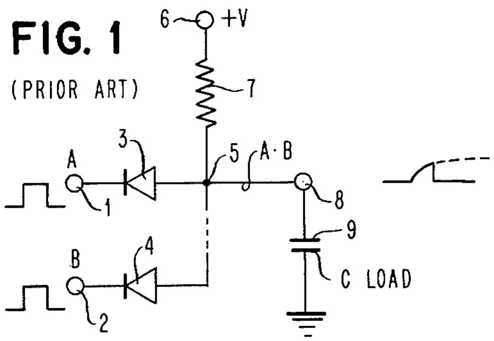
FIG. 1 (PRIOR ART)
FIGS. 1 and 2 are illustrative of prior art AND and OR circuits respectively.
Figure 2:
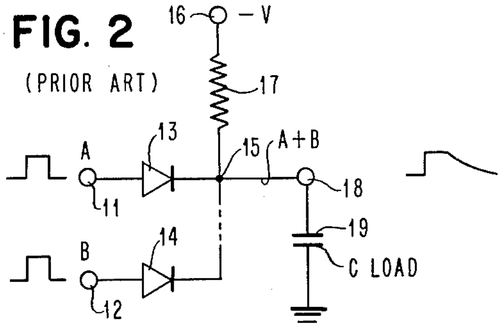
FIG. 2 (PRIOR ART)

Referring now to the drawings, FIGS. 1 and 2 are conventional diode logical circuits. The AND circuit of FIG. 1 comprises a pair of unidirectionally conducting devices, such as diodes, 3 and 4, having their positive or anode terminals connected in common at point 5. As indicated by the dotted line, the number of diodes may be increased. Positive voltage source 6 and resistor 7 connected to terminal 5 maintain these diodes normally conductive. Capacitor 9, connected between output terminal 8 and reference potential, represents the capacitive impedance presented by succeeding stages of similar logical circuitry. In the no input signal condition, input terminals 1 and 2 are relatively negative. The diodes 3 and 4 are therefore forward biassed from source 6 and the capacitive load 9 has a low impedance discharge path through both of these diodes. In this condition, then, the load capacitance is maintained discharged. When a single input signal A or B, is applied to either terminal 1 or 2, the respective diode 3 or 4 becomes reversed biassed. However, since the other diode remains forward biassed, a low impedance discharge path for the capacitance 9 is still present and no change occurs at output terminal 8. Should positive potential be applied to terminals 1 and 2 simultaneously, both diodes 3 and 4 become reverse biassed. Load capacitance 9 no longer has a low impedance discharge path and begins to charge towards the positive voltage at 6 through resistance 7. The output waveform, indicating the logical function $A \cdot B$, therefore follows the familiar exponential curve shown. When one or both of the inputs goes negative, a low impedance discharge path is provided through the associated diode or diodes for the now charged load capacity. The discharge is therefore quite rapid and the potential at terminal 8 substantially follows the fall in input potential. Since certain minimum signal amplitudes are required to operate successive stages of logical circuitry, it can be readily seen that the exponential voltage rise of the output signal necessitates a certain delay before the circuit can be used to perform an additional logical function. The rise time of the output potential can be decreased by making resistance 7 very small and voltage source 6 very large. This will then require that the input signal levels be quite high to enable them to back bias the diodes and thereby achieve the logical function. Thus the driving sources used to generate the input signals must be made quite powerful. This requirement poses severe limitations on the design of the driving sources as well as of all the logical circuitry.

A similar effect is present in the prior art OR circuit of FIG. 2. In the absence of an input signal A or B at any of the input terminals 11, 12, the diodes 13 and 14 are reversed biassed. Load capacitance 19 therefore charges negatively towards the negative voltage at 16 through resistor 17. Assuming capacity 19 to be fully charged, a positive input at either terminal 11 or 12, or both, forward biases the associated diodes, providing a low impedance discharge path for the negative charge on the capacitance. Thus the voltage at output terminal 18 rises steeply, substantially with the same slope as the rise in input voltage. At the termination of the input signal or signals, capacity 19 begins to charge towards the negative voltage of 16, with the resultant exponential fall time shown. This relatively slow fall time presents the same circuit delay as noted above with respect to the rise time of FIG. 1.

Figure 3:
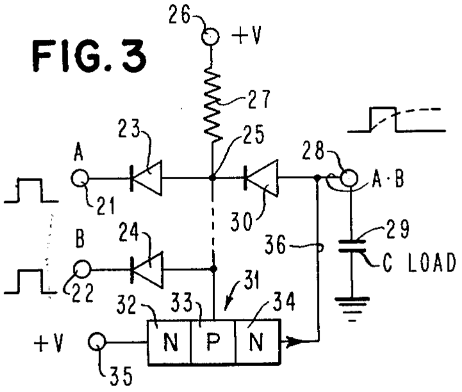
FIGS. 3 and 4 illustrate an AND and an OR circuit respectively, utilizing principles of this invention.

In FIG. 3 is shown an AND circuit according to one application of this invention. Asymmetrically conducting devices 23 and 24, shown as diodes, have their positive or anode terminals connected in common to junction 25. The dotted line between the two diodes is used to indicate that more than two such diodes may be used to make an "N" way AND circuit. A positive voltage source 26 is coupled through resistor 27 to the junction 25. Input terminals 21 and 22 are coupled to the cathode or negative terminals of the diodes 23 and 24 respectively. Connected between the junction 25 and the output terminal 28 is an additional asymmetrically conducting device 30. This device, which may be a diode such as 23 or 24, is oriented to have its positive or anode terminal coupled to the output terminal 28 and its negative or cathode terminal coupled to the junction 25. The load capacitance of the succeeding circuitry is represented by the capacitor 29 connected between the output terminal 28 and reference potential. Transistor 31 is shown as being of the NPN junction type, having a collector 32, base 33 and emitter 34. A positive voltage source 35 provides collector bias for the transistor. The base 33 of the transistor is coupled to the junction 25 and its emitter is coupled by lead 36 to the output terminal line 28. Thus the diode 30 is connected in parallel with the base-emitter diode of the transistor.

The diodes 23, 24 and voltage source 26 and resistor 27 are substantially the same as the conventional diode circuit of FIG. 1, and operate in similar manner. Thus, as long as the input line at 21 or 22 or both are negative, the diodes 23 or 24 or both, are conductive and the potential at the junction 25 is at its most negative level. The diode 30 is so oriented in this condition as to present a highly conductive path to any charge stored in the load capacitance 29. The conduction through diode 30 provides a small voltage drop which reverse biases the base-emitter junction of the transistor 31. This maintains the transistor non-conductive in the Off condition of the circuit. When both inputs A and B are up, or positive, simultaneously, diodes 23 and 24 are back biassed and junction 25 rises in potential, as explained above in connection with FIG. 1. This also back biases the diode 30 and the load capacitance 29 begins to charge towards the positive potential 26 through the high back resistance of diode 30. As the junction 25 rises in potential, a forward bias is placed on the base 33 of the transistor 31. This renders the transistor conductive and it supplies current to the output terminal 28. The transistor then becomes a current source supplying the charging current required by the load capacitance. It is to be understood that the transistor 31 becomes conductive substantially simultaneously with the back biassing of the diodes 23, 24 and 30. Therefore, the potential at the output terminal 28, instead of rising exponentially towards the voltage 26 as shown by the dotted curve, is supplied with a heavy charging current from the transistor 31 and its potential rises steeply towards its full charge condition, shown by the solid line. The capacitance thus charges towards the potential at 35 through the low impedance of the conducting transistor. This has the effect of making the rise time of the output pulse of substantially the same slope as the rise time of the input pulses, thereby materially decreasing the delay of the logical stage. When one or both of the inputs goes negative again, a low impedance discharge path for the load capacity 29 is established through diode 30 and either or both of the diodes 23, 24. The conduction through diode 30 reverse biases the transistor 31 to render it non-conductive and thereby disable the auxiliary current source. Thus, the capacitance discharges rapidly making the fall time of the output pulse substantially the same as that of the input pulses.

Figure 4:
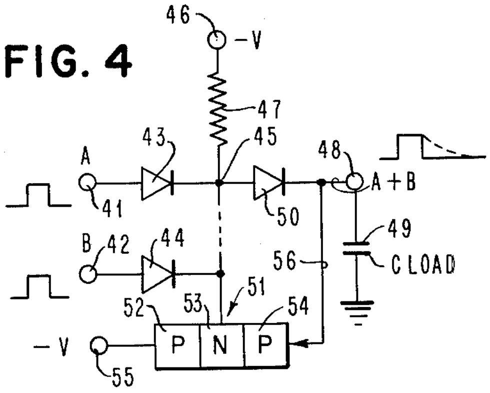

The circuit of FIG. 4 is an OR circuit utilizing the same principle as explained in connection with FIG. 3. Diodes 43, 44, resistor 47, and negative voltage source 46 are connected in a conventional OR configuration as shown in FIG. 2. The dotted line connecting the cathode or negative terminal of diode 44 to the junction 45 is used to indicate that more than two diodes may be used to create an "N" way OR circuit. Additional diode 50 is connected between the junction 45 and the output terminal 48 and is oriented to have its positive or anode terminal connected to the junction 45. The capacitance 49 represents the capacity of succeeding stages of logical circuitry. Transistor 51 is shown as being of the PNP junction type, having a collector 32, base 53, and emitter 54; base 53 being connected to junction 45 and emitter 54 being connected over lead 56 to the positive terminal of diode 50. Negative voltage source 55 provides collector potential for the transistor.

In the Off condition of the circuit, when both inputs A and B are down or negative, the diodes 43 and 44 are reverse biassed and junction 45 is approximately at the potential of source 46. Diode 50 is also reverse biassed. However, the negative potential at junction 45 is applied to the base 53 of the transistor. This renders the transistor 51 conductive thereby establishing a low impedance conducting path from the load capacity 49 through the transistor 51. In the Off condition then the output line is kept at a negative level equal to the collector potential 55 and the load capacitance remains discharged. When either or both of the input signals goes positive, a low impedance conduction path is established through the diode 43 or 44 or both, through the diode 50 and into the load capacity 49. The rise in potential at 45 reverse biases transistor 51 to cut it off. This charges the load capacity rapidly to the level of the input signal and the rise time of the output signal substantially approaches that of the rise of the input. When both inputs go negative again, the diodes 43, 44 are again reverse biassed dropping the junction 45 to the negative potential of source 46. This turns on transistor 51 providing the above mentioned low impedance discharge path for the load capacitance 49. Therefore, the fall time of the output pulse is substantially the same as the fall time of the input pulse rather than the exponential fall shown in dotted lines. The transistor 51 acts as a current source supplying negative charging current to the load capacity 49. By means of this operation, the effective time delay of the entire logical stage is materially decreased with respect to that of the conventional OR circuit such as shown in FIG. 2.

Figure 5:
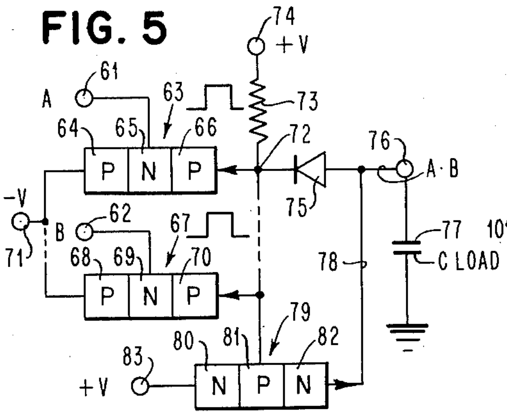
FIGS. 5 and 6 illustrate an AND and an OR circuit respectively utilizing another form of this invention.

In FIG. 5 is shown an AND circuit according to another application of the invention utilizing the same principle that is explained in connection with FIG. 3. The principal difference between the circuits of FIG. 5 and FIG. 3 is that the former utilizes emitter follower transistor logic instead of the diode logic of the latter. In other respects the circuits are similar. Input transistors 63 and 67 are shown connected as emitter followers having their emitters coupled in common to the junction 72, the dotted lines indicating that additional transistors may be provided. These transistors are shown to be of the PNP junction type having collectors 64, 67, bases 65, 69, and emitters 66, 70. Collector potential is supplied from source 71 to the collectors of both transistors. Input signals to the circuit are applied at terminals 61, 62, connected to the respective bases of the transistors. Between the junction 72 and the output terminal 76 is connected diode 75, with its positive or anode electrode connected to the output terminal. Capacitance 77 connected between output terminal 76 and reference potential represents the load capacity of succeeding logical circuits. NPN junction transistor 79, having collector 80, base 81, and emitter 82, is connected with its base-emitter junction across the terminals of the diode 75. It will be noted that this connection is similar to that shown in FIG. 3 with respect to transistor 31 and diode 30. Positive voltage source 83 supplies collector potential for the transistor 79.

With either or both of the input signals at terminals 61 and 62 at their most negative level, the associated transistor 63 or 67, or both of them, are biassed into conduction. This establishes a low impedance conduction path from the load capacity 77 through the transistors and diode 75. This maintains the output level at terminal 76 negative and keeps the capacitor 77 charged to the negative potential at 71. The conduction through diode 75 maintains the base 81 of transistor 79 slightly negative with respect to emitter 82 thereby biassing it off. When both inputs are positive, both the transistors 63, 67 are biassed off and junction 72 rises in potential towards that of voltage source 74. This biasses transistor 79 into conduction and the latter transistor acts as a current supply to charge the output or load capacitance 77 towards the positive potential at 83. Thus the rise time of the output pulse very nearly approaches that of the input pulses. This results in a speed saving as explained hereinabove. When one or both of the input signals falls negative, its associated transistor is rendered conductive providing a low impedance discharge path for the load capacitors 77. This also drops the potential at junction 72 turning off the transistor 70. The fall time of the output pulse therefore is substantially the same as that of the input pulse. It will be noted that this manner of operation is similar to that discussed in connection with FIG. 3 above.

Figure 6:
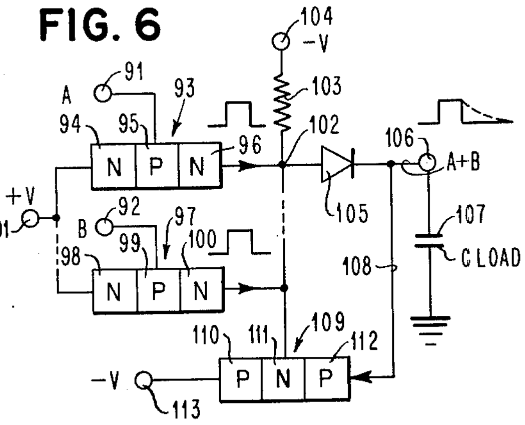

FIG. 6 illustrates the OR circuit of this embodiment and bears the same relation to FIG. 5 as FIG. 4 bears to FIG. 3. Transistors 93, 97 shown to be of the NPN junction type, are not conductive when the input signal levels are negative. The negative voltage at terminal 10 therefore is applied through resistor 103 to the junction 102. Diode 105, having its positive or anode terminal connected to the junction 102, is therefore reverse biassed with respect to the output terminal 106. PNP junction transistor 109, however, has its base 111 connected to the junction 102 and its emitter 112 connected over line 108 to the output terminal 106. This connection biasses the transistor into conduction and it therefore provides a low impedance discharge path for the load capacitance 107 through the transistor to the negative collector supply 113. This maintains the output terminal at its most negative level. If a positive level is impressed on either or both of input terminals 91, 92, its associated transistor base 95, 99 respectively is forward biassed with respect to its associated emitter 96, 100 and the transistor goes into conduction. This drives current through the diode 105 into the load capacity 107 to charge the latter towards the positive voltage 101. At the same time, the junction 102 becomes positive in potential and transistor 109 is rendered non-conductive. Thus the rise time at the output terminal is substantially the same as that of the input signal. When all of the input signals again go negative, junction 102 falls in potential towards the level at terminal 104 biassing transistor 109 into conduction. This back biases diode 105 but provides a low impedance discharge path for the capacitance 107 through the transistor 109. Therefore, the fall time of the output pulse approaches that of the input pulse rather than the exponential fall shown in dotted line. This provides the overall speed increase of signal propagation through the circuit.

As will be apparent from consideration of the circuits of FIGS. 3 to 6 discussed above, the novel aspects of these circuits provides means whereby switching delays normally occasioned by known diode and transistor switching circuitry are minimized. This effect is achieved by increasing the slope of the rise and fall times of signals whereby the output signal level of any single stage reaches its usable value more quickly than, for example, the output signal of the prior art diode AND circuit of FIG. 1. This enables the circuitry to accept a higher signal repetition rate than heretofore, with a resultant total increase in speed of the machine incorporating the circuits. As will be readily appreciated, the teaching of this invention may be adapted to forms of logical circuitry other than those shown.

Figure 7:
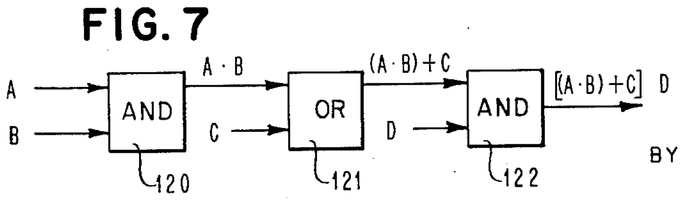
FIG. 7 is a block diagram indicating a manner of interconnection of the blocks of FIGS. 3 to 6 to utilize the complementary action thereof.

In FIG. 7 is shown a block diagram of a logical flow arrangement that most advantageously uses the benefits of the above described circuits. AND block 120, which may be either that shown in FIG. 3 or FIG. 5, has inputs A and B applied thereto with the resultant output $A \cdot B$. This output is applied to one input of the OR block 121 which may be either of the embodiments shown in FIG. 4 or FIG. 6. To the input of the OR block 121 is applied a signal C producing an output $(A \cdot B)+C$. The output of the OR block 121 is applied to succeeding AND circuit 122 along with an additional input D. This produces an output $[(A \cdot B)+C]D$ as indicated in the drawing. Preferably AND and OR blocks of the same embodiment should be used in each logic chain of this type, however the embodiments of FIGS. 3 and 4 may be mixed with those of FIGS. 5 and 6. Considering the interconnection, for example, of the AND block of FIG. 3 as one of the inputs to the OR block of FIG. 4, it will be seen that when the AND circuit is performing its function the transistor 31 is providing an output which is applied to the input of the succeeding stage. At this time the OR circuit of FIG. 4 has its transistor 51 biassed off. When the output of the AND circuit falls, and assuming that no other input is being applied to the succeeding OR circuit, the transistor 51 of the OR circuit of FIG. 4 is rendered conductive to draw current from the load capacity presented by succeeding circuitry. Thus insofar as two successive circuits of this nature are concerned, their respective transistors or auxiliary current supplies act as complementary emitter followers providing currents to their succeeding stages in opposite directions. This arrangement permits rapid switching as discussed hereinabove and also provides, by its very nature, low impedance driving sources for succeeding stages of circuitry. This lends itself to a much more efficient arrangement than heretofore used. Since each stage is in effect self-powered, large driving sources are not necessary. Additionally, distortion which is caused by pulse rounding in circuits such as of FIGS. 1 and 2 is eliminated. The speed advantage, of course, is discussed above.

It will be recognized that any suitable type of transistor, other than the junction variety, may be used in the embodiments of FIGS. 3 to 6.

While the invention has been particularly shown and described with reference to preferred embodiments thereof, it will be understood by those skilled in the art that various changes in form and details may be made therein without departing from the spirit and scope of the invention.

What is claimed is:

A multistage combinatorial logic system operable with minimum delay time at low power levels in response to a plurality of binary coded input signals having up and down levels to provide a binary coded signal having well-defined transition times at an output terminal for said system, comprising in combination a cascaded arrangement of a plural number of combinatorial logic blocks having capacitive loads and connected to enable alternate blocks to perform AND and OR logical functions with minimum delay time and having well-defined rise times for said blocks performing the AND function and well-defined fall times for said blocks performing the OR function; each of said blocks consisting of a logic performing circuit and a coupling network for connecting the associated logic circuit except the last logic circuit to the next succeeding logic circuit, the coupling network of the last block connecting the associated logic circuit to the system output terminal; each logic circuit for performing the AND logical function having at least two input terminals and one output terminal and consisting of in combination a current supply connected to the circuit output terminal, a voltage supply of negative polarity, a plurality of PNP transistors, each having a base, emitter and collector and connected in emitter follower circuit configuration, said transistors being equal in number to the number of input terminals for that circuit, so that each input terminal is connected to a transistor base, each of said collectors being directly connected to said negative voltage supply and each of said emitters being directly connected to the output terminal for that logic circuit, said circuit producing an up level at said circuit output terminal only when an up level signal is provided at all circuit input terminals; each logic circuit for performing the OR logical function having at least two input terminals and one output terminal and consisting of in combination a current sink connected to the circuit output terminal, a voltage supply of positive polarity, a plurality of NPN transistors, each having a base, emitter and collector and connected in emitter follower circuit configuration, said transistors being equal in number to the number of input terminals for that circuit, so that each input terminal is connected to a transistor base, each of said collectors being directly connected to the positive voltage supply and each of said emitters being directly connected to the output terminal for that circuit, said circuit producing a down level at said circuit output terminal only when a down level signal is provided at all circuit input terminals; each of said networks associated with a logic circuit for performing the AND logical function consisting of a semiconductor diode and an additional transistor having emitter, base and collector and connected as an emitter follower, said additional transistor being of the NPN type, a voltage supply of positive polarity directly connected to the collector of the additional NPN transistor, means for directly connecting the base of said additional NPN transistor to the output terminal of the associated logic circuit, and means for directly connecting the emitter of said additional NPN transistor to one of the input terminals of the next succeeding logic performing circuit, the base and emitter of the said additional NPN transistor being connected in parallel and oppositely poled to the diode of the respective network, said additional NPN transistor being normally nonconductive and the associated diode conductive enabling the associated diode to form part of a discharge path for the capacitive load for that block, said additional NPN transistor being rendered conductive and said diode nonconductive on the occurrence of an up level at the output terminal for the associated logic stage, so that said additional NPN transistor acts as a current source to charge the capacitive load for that block, thereby providing a well-defined rise time output signal for that logic block; each of said networks associated with a circuit for performing the OR logical function consisting of a semiconductor diode and an additional transistor having emitter, base and collector and connected as an emitter follower, said additional transistor being of the PNP type, a voltage supply of negative polarity directly connected to the collector of the additional PNP transistor, means for directly connecting the base of said additional PNP transistor to the output terminal of the associated logic circuit, and means for directly connecting the emitter of said additional PNP transistor to one of the input terminals of the next succeeding logic performing circuit, the base and emitter of said additional PNP transistor being connected in parallel and oppositely poled to the diode of the respective network, said additional PNP transistor being nonconductive when the associated logic circuit provides an up level signal at the circuit output terminal enabling the associated diode to form a charging path for the capacitive load for that block, said additional PNP transistor being at the circuit output terminal permitting said additional PNP transistor to act as a current sink to discharge the capacitive load for that block, thereby providing a well-defined fall time output signal for that logic block, the coupling network for the last logical circuit having the emitter of the additional transistor coupled to the system output terminal, whereby as each logic block performs its desired logical function the cumulative system delay time is reduced and said binary coded signal is provided at said system output terminal.

References Cited in the file of this patent

UNITED STATES PATENTS

| | | |
|---|---|---|
| 2,798,667 | Spielberg | July 9, 1957 |
| 2,850,647 | Fleisher | Sept. 2, 1958 |
| 2,853,632 | Gray | Sept. 23, 1958 |
| 2,966,305 | Rosenberger | Dec. 27, 1960 |

FOREIGN PATENTS

| | | |
|---|---|---|
| 802,307 | Great Britain | Oct. 1, 1958 |
| 829,261 | Great Britain | Mar. 2, 1960 |
| 1,039,570 | Germany | Sept. 25, 1958 |

OTHER REFERENCES

Richards: Digital Computer Components and Circuits, D. Van Nostrand, Princeton, N.J., 1957, pages 175–176 relied on.

Richards: Digital Computer Components and Circuits, D. Van Nostrand, Princeton, N.J., November 1957, page 38 relied on.